United States Patent
Parekh et al.

(10) Patent No.: US 7,610,453 B1
(45) Date of Patent: Oct. 27, 2009

(54) REORDERING EACH ARRAY IN A SEQUENCE OF ARRAYS

(75) Inventors: Hemang Maheshkumar Parekh, San Jose, CA (US); Jeffrey Allan Graham, Sydney (AU); Hai-Jo Tarn, San Jose, CA (US); Elizabeth R. Cowie, Edinburgh (GB); Vanessa Yi-Mei Chou, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 511 days.

(21) Appl. No.: 11/527,883

(22) Filed: Sep. 27, 2006

(51) Int. Cl.
*G06F 12/00* (2006.01)
(52) U.S. Cl. .................. 711/154; 711/E12.045
(58) Field of Classification Search ............ 711/154, 711/E12.045
See application file for complete search history.

(56) References Cited

U.S. PATENT DOCUMENTS 6,105,114 A * 8/2000 Okuno .................. 711/155

2007/0291735 A1 * 12/2007 Fidler et al. ............. 370/352

OTHER PUBLICATIONS

Peter Alfke; The Programmable Gate Array Data Book; ""Corner Bender" or 8-Bit Format Converter"; Application Brief; Copyright 1991; Xilinx, Inc., 2100 Logic Drive, San Jose, California 95124; p. 6-44.

* cited by examiner

*Primary Examiner*—Matt Kim
*Assistant Examiner*—John P Fishburn
(74) *Attorney, Agent, or Firm*—LeRoy D. Maunu

(57) ABSTRACT

Each array in a sequence of arrays is reordered. A first port receives in a first serial order a number of values in each array in the sequence and a second port transmits the values in a different second serial order. For each value in each array in the sequence, the address generator generates an address within a range of zero through one less than the number of values in the array. For each address from the generator, the memory performs an access to a location corresponding to the address in the memory. The access for each address includes a read from the location before a write to the location. For each array in the sequence, the writes for the addresses serially write the values of the array in the first serial order and the reads for the addresses serially read the values in the second serial order.

20 Claims, 6 Drawing Sheets

300

302

| Memory accesses | Write array | Count bits selected for write address | Read array | Count bits selected for read address | Rotation amount |
|---|---|---|---|---|---|
| 1st 256 | 1 | 7, 6, 5, 4, 3, 2, 1, 0 | - | Discarded read | 3 * 0 mod 8 = 0 |
| 2nd 256 | 2 | 4, 3, 2, 1, 0, 7, 6, 5 | 1 | 4, 3, 2, 1, 0, 7, 6, 5 | 3 * 1 mod 8 = 3 |
| 3rd 256 | 3 | 1, 0, 7, 6, 5, 4, 3, 2 | 2 | 1, 0, 7, 6, 5, 4, 3, 2 | 3 * 2 mod 8 = 6 |
| 4th 256 | 4 | 6, 5, 4, 3, 2, 1, 0, 7 | 3 | 6, 5, 4, 3, 2, 1, 0, 7 | 3 * 3 mod 8 = 1 |
| 5th 256 | 5 | 3, 2, 1, 0, 7, 6, 5, 4 | 4 | 3, 2, 1, 0, 7, 6, 5, 4 | 3 * 4 mod 8 = 4 |
| 6th 256 | 6 | 0, 7, 6, 5, 4, 3, 2, 1 | 5 | 0, 7, 6, 5, 4, 3, 2, 1 | 3 * 5 mod 8 = 7 |
| 7th 256 | 7 | 5, 4, 3, 2, 1, 0, 7, 6 | 6 | 5, 4, 3, 2, 1, 0, 7, 6 | 3 * 6 mod 8 = 2 |
| 8th 256 | 8 | 2, 1, 0, 7, 6, 5, 4, 3 | 7 | 2, 1, 0, 7, 6, 5, 4, 3 | 3 * 7 mod 8 = 5 |
| 9th 256 | 9 | 7, 6, 5, 4, 3, 2, 1, 0 | 8 | 7, 6, 5, 4, 3, 2, 1, 0 | 0 (same as first) |

REORDERING EACH ARRAY IN A SEQUENCE OF ARRAYS

FIELD OF THE INVENTION

The present invention generally relates to digital signal processing, and more particularly to reordering an array of signal values.

BACKGROUND

Certain applications, such as digital signal processing, may process sequences of arrays of digital values, such as digital values representing an analog value for a signal. A processing step that is frequently required in these applications is array reordering including transposing of the dimensions of the array. For example, an array may have rows and columns of values, and the rows of the array may become the columns of a transposition of the array and similarly the columns of the array may become the rows of the transposition of the array.

An example application for array transposition is digital signal processing that uses time-division multiplexing to process digital signal data from multiple channels. The signals from the channels may be sampled in parallel, but the processing of the sampled data may require that a block or packet of data is first assembled from each channel. The processing may be time-division multiplexed to operate on a block of data from each channel in a round-robin order. The sampled data may be considered a sequence of arrays of signal values with each array in the sequence having a number of rows equaling the number of channels and a number of columns equaling the length of the block or packet of data. Transposing of each array in the sequence may be used to assemble a block of data for each channel, and each assembled block of data may be serially processed using time-division multiplexing.

An existing transposition circuit uses two buffers, with each buffer holding one array of data. Columns of data values are written to the first buffer while rows of data values are read from the second buffer. After the first buffer is filled and the second buffer is emptied, the buffers may switch roles in a "ping-pong" operation that writes columns of data to the second buffer and reads rows of data from the first buffer. The "ping-pong" operation may continue with columns of data written to an alternating one of the buffers while rows of rows of data are read from the other one of the buffers.

There is a general need for digital signal processing circuits that efficiently utilize memory and other resources.

The present invention may address one or more of the above issues.

SUMMARY OF THE INVENTION

Various embodiments of the invention provide a circuit for reordering each array in a sequence of arrays, with each array in the sequence having at least two dimensions. The circuit includes first and second ports, an address generator, and a memory. The first port receives in a first serial order a number of values in each array in the sequence. The second port transmits the values in each array in the sequence in a second serial order that is different from the first serial order. The address generator generates an address for each value in each array in the sequence. The address for each value in each array in the sequence is within a range of zero through one less than the number of values in the array. The memory is adapted to perform an access to a location in the memory for each address from the generator. The access for each address includes a read from the location that corresponds to the address before a write to the location in the memory. The writes for the addresses serially write the values in the first serial order for each array in the sequence and the reads for the addresses serially read the values in the second serial order for each array in the sequence.

Various other embodiments of the invention provide a method for transposing each array in a sequence of arrays. Each array in the sequence has a first number of rows and a second number of columns, and a third number of the values in the array is a product from multiplying the first and second numbers. The values in each array in the sequence are input in a column-wise serial order. An address is serially generated for each value in each array in the sequence. The address for each value in each array in the sequence is within a range of zero through one less than the third number of the values in the array. The memory is read and written for each address, including reading a location of the memory at the address before writing the location of the memory at the address. The writing of the memory for the addresses of each array in the sequence includes serially writing the values in the column-wise serial order for the array and the reading of the memory for the addresses of each array in the sequence includes serially reading the values in a row-wise serial order for the array. The values in each array in the sequence are output in the row-wise serial order.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which:

FIG. 3 is a table illustrating rotation amounts for calculating memory addresses for each array in the example sequence of FIG. 2;

DETAILED DESCRIPTION

Figure 1:
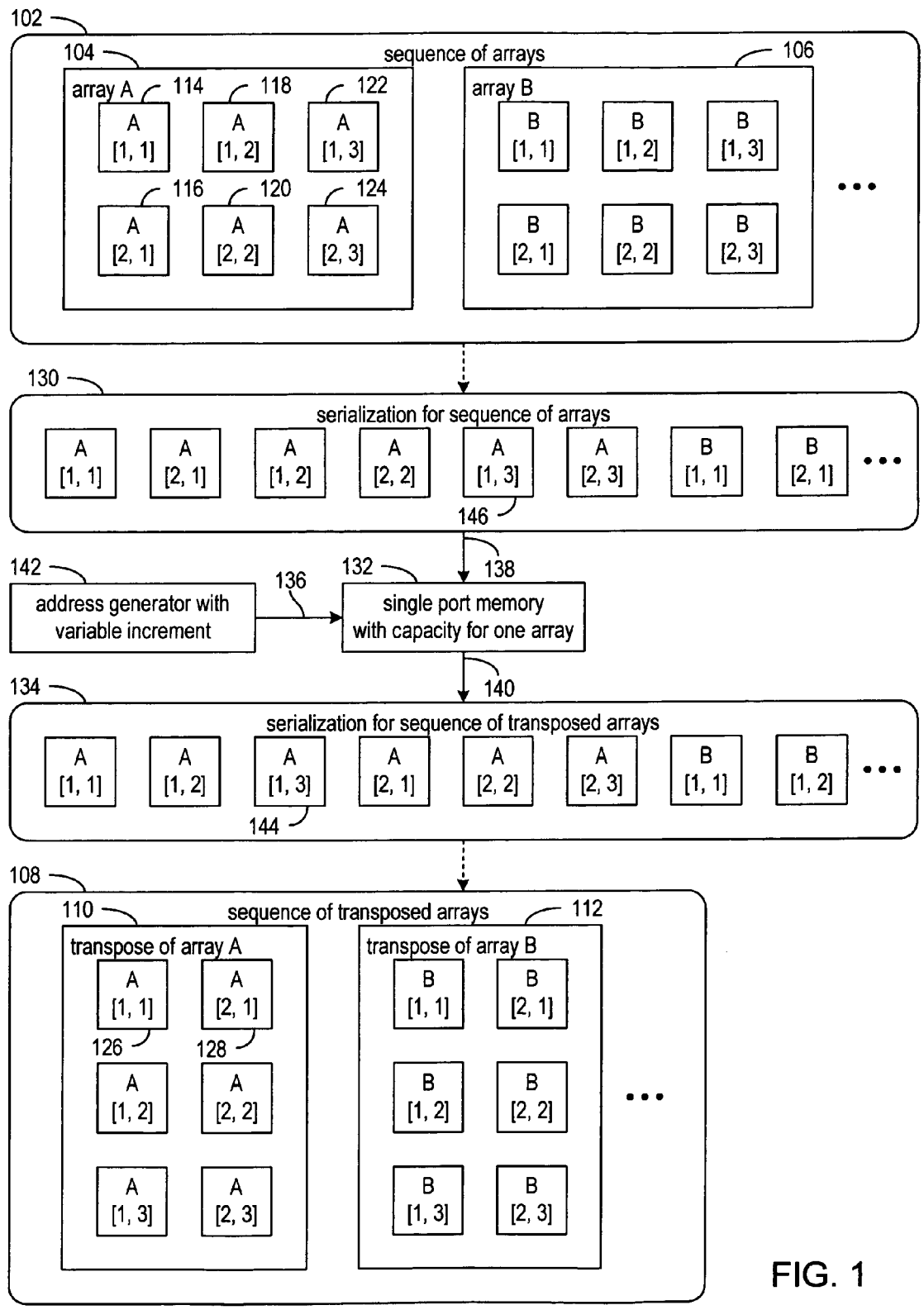
FIG. 1 is a data flow diagram illustrating the transposing of an example sequence of arrays in accordance with various embodiments of the invention.

FIG. 1 is a data flow diagram illustrating the transposing of an example sequence 102 of arrays 104 and 106 in accordance with various embodiments of the invention. Each array 104, 106, 110, and 112 and each serialization 130 and 134 includes values, such as value 114 of array 104, that are each labeled with an array name and indices of the value within the array, such as array A and indices [1,1] for value 114 of array 104. The output sequence 108 of arrays 110 and 112 may be generated from the input sequence 102 of arrays 104 and 106, with array 110 being a transpose of array 104 and array 112 being a transpose of array 106.

Array 104 may include six values 114 through 124 arranged in an array of two rows and three columns, with the number of the values 114 through 124 being a product of the number of rows and the number of columns. Values 114 and 116 may form a first column of array 104, values 118 and 120 may form a second column, and values 122 and 124 may form a third column. Similarly, values 114, 118, and 122 may form a first row of array 104 and values 116, 120, and 124 may form a second row. The transpose array 110 may interchange the rows and columns of array 104. Thus, the first column of values 114 and 116 of array 104 may become the first row of values 126 and 128 of array 110. Similarly, the second and third columns of array 104 may become the second and third rows of array 110 and the first and second rows of array 104 may become the first and second columns of array 110.

Serialization 130 may provide a serial order for the values, such as value 114, in arrays 104 and 106 in sequence 102. For example, a column-wise serial order for serialization 130 may order the values each of arrays 104 and 106 primarily by columns and secondarily by rows within each column. Thus, serialization 130 may begin with the values 114 and 116 of the first column of array 104 with value 114 from the first row of array 104 appearing in serialization 130 before value 116 from the second row of array 104. Sequence 102 may order array 104 before array 106, and the ordering of arrays 104 and 106 in sequence 102 may be reflected by serialization 130 including all of the values 114 through 124 of array 104 before any of the values of array 106.

In various embodiments of the invention, a single port memory 132 receives the values from each array 104 and 106 in the sequence 102 in the serial order of serialization 130 and the single port memory 132 transmits these values in a different serial order of serialization 134. For example, serialization 130 may be a column-wise serial order of the values in arrays 104 and 106 in sequence 102 and serialization 134 may be a row-wise serial order of the values in arrays 104 and 106 in sequence 102. Alternatively, the example with serialization 134 being a row-wise serial order of the values in arrays 104 and 106 in sequence 102 may be interpreted as being a column-wise serial order of the values in transposed arrays 110 and 112 of sequence 108.

Serialization 130 may generally provide a serial ordering of the values in arrays 104 and 106 of sequence 102 of one type, such as a column-wise order or a row-wise order, and serialization 134 may provide a serial ordering of the values in arrays 104 and 106 of sequence 102 of a different type. In addition, serialization 130 may generally provide a serial ordering of the values in arrays 104 and 106 of sequence 102 of a particular type, such as a column-wise order or a row-wise order, and serialization 134 may provide a serial ordering of the values in transposed arrays 110 and 112 of sequence 108 of the same particular type.

While the sequences 102 and 108 of arrays are useful for explaining the ordering of values in serializations 130 and 134, it will be appreciated that sequences 102 and 108 and arrays 104, 106, 110, and 112 may exist only conceptually and might not exist separately from serializations 130 and 134.

In certain embodiments of the invention, a serialization 130 of sequence 102 of two-dimensional arrays 104 and 106 is reordered into a serialization 134 of sequence 108 of transposed two-dimensional arrays 110 and 112. Array 110 may be a transpose of array 104 that swaps the row and column dimensions of array 104. In certain other embodiments of the invention, a serialization of arrays with more than two dimensions is reordered into a serialization of transposed arrays with more than two dimensions. In one example, each array in a sequence of arrays may have three dimensions including a row dimension, a column dimension, and a depth dimension. The reordering may interchange the row, column, and depth dimensions of each array in an input sequence to generate a corresponding array in an output sequence. The interchange of the row, column, and depth dimensions may use any permutation of these dimensions.

In certain embodiments of the invention, the memory 132 has a single port that includes an address input on line 136, a data input on line 138, and a data output on line 140. The address input on line 136 may receive an address from an address generator 142, the data input on line 138 may receive the values of a sequence of arrays in the serial order of serialization 130, and the data output on line 140 may transmit the values of a sequence of arrays in the serial order of serialization 134.

Each of the values of serialization 134 should not be read from memory 132 until the memory 132 is written with the corresponding value from serialization 130. For example, value 144 of serialization 134 should not be read from memory 132 until the memory 132 is written with the value 146 of serialization 130. Thus, the serial reading of serialization 134 from memory 132 should be delayed in time from the serial writing of serialization 130 to memory 132. For a memory 132 supporting a read and a write for each unit of time, the amount of the delay may be a number of time units approximately equaling the number of values in one of the arrays 104 and 106 in sequence 102. In addition, each of the values of serialization 134 should be read from memory 132 before the value of serialization 134 is overwritten in memory 132 by another value from serialization 130.

In existing circuits for transposing each array in a sequence of two-dimensional arrays, two "ping-pong" buffers support the delay between writes and reads of values together with prevention of overwrites. Both ping-pong buffers have a capacity for storing the values of one of the arrays, and while one ping-pong buffer is filled with values, the other ping-pong buffer is emptied of values. Usually, the value at a particular row and column of the arrays in a sequence is always written to the same of address in one or the other of the ping-pong memories. Because the address for writing values is generally different that the address for reading values, a memory that includes both ping-pong buffers has either two ports or a single port that is time-multiplexed between reading and writing.

In contrast, various embodiments of the invention may have a single memory 132 that has a capacity for storing the values of just one of the arrays 104 or 106, and the single memory 132 may continuously store a number of the values from serialization 130 that equals the number of the values in one of the arrays 104 or 106. As one value is read for serialization 134, another value is written from serialization 130. In one or more embodiments, the memory 132 may have a single port that is not time-multiplexed between reading and writing. The single port has an address input on line 136 and a location in the memory 132 selected by the address on line 136 may be both written with a value from serialization 130 and read for a value of serialization 134. To prevent overwriting, a combined read/write access may read the current value of the location in the memory 132 before writing the location.

Alternatively, the single port may be time-multiplexed to read the current value of the location in the memory 132 before a write to the location.

Figure 2:
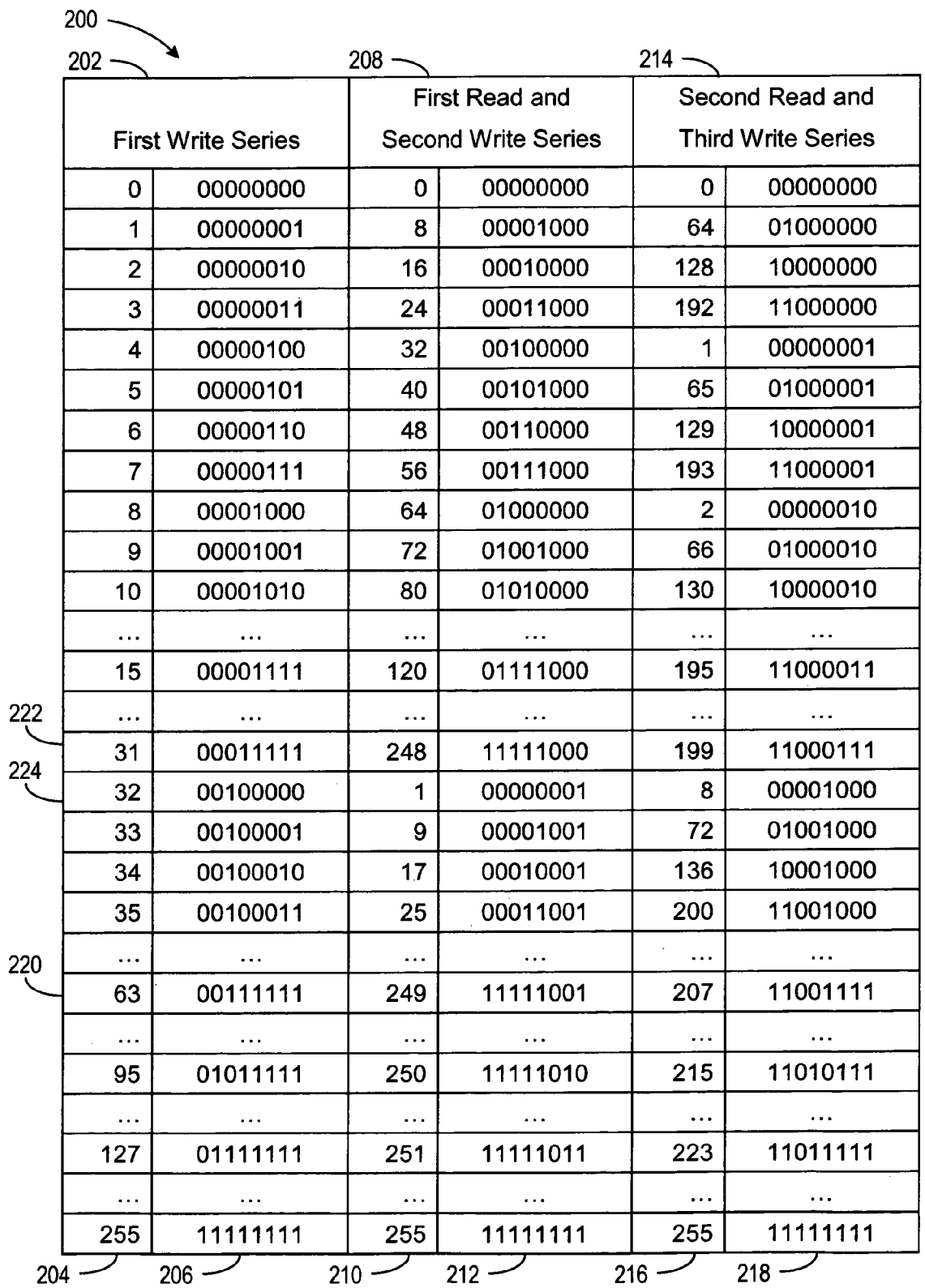
FIG. 2 is a table illustrating the addressing of a memory for reordering an example sequence including three arrays in accordance with various embodiments of the invention.

FIG. 2 is a table 200 illustrating the addressing of a memory for reordering an example sequence including three arrays in accordance with various embodiments of the invention. Each array in the sequence is two-dimensional with a size of 8 by 32 for a total of 256 values in each array, and the addresses correspondingly have a range in decimal from 0 to 255. Column 202 of table 200 shows the address progression for a first array in the sequence, with columns 204 and 206 respectively showing the decimal and binary addresses of the progression. Similarly, column 208 shows the address progression for a second array in the sequence with decimal and binary address in respective columns 210 and 212, and column 214 shows the address progression for a third array in the sequence with decimal and binary address in respective columns 216 and 218.

The addresses serially supplied to the memory are the addresses down column 202, followed by the addresses down column 208, and then the addresses down column 214. The memory may initially be empty and the memory may be filled with the values of the first array in the sequence by counting through a series of successive addresses 0, 1, 2, 3, ..., 254, and 255 as shown in column 204. The values of the first array may be written to the series of successive addresses in an input order, which for this example is a column-wise order of the values in the first array.

After the memory is filled with the values of the first array, the first array may be transposed by reading the values of the first array in the output order that is different from the input order. For this example the output order is a row-wise order. Because the values of the first array should be read from the memory in the output order, a specific series of addresses should be used to read the memory. Thus, to perform a transpose reordering of the values of the first array, the values of the first array may be read using the series of addresses shown in column 210. This series of addresses includes the addresses 0, 8, 16, ..., and 248 to read the 32 values of a top row of the first array, followed by the addresses 1, 9, 17, ..., and 249 to read the 32 values of a next row of the first array, and so on to read the remaining rows of the first array.

In various embodiments of the invention, each address of column 210 used for reading a value of the first array from the memory is the same address used for writing a value of the second array to the memory. Using the same address for reading a value of the first array and writing a value of the second array permits the memory to be a single port memory with a reduced storage capacity. To prevent data loss at each address of the series of column 210, a value of the first array is read from the memory before a value of the second array is written to the memory. The values of the second array may be written to the memory in the same type of input order that is used for writing the values of the first array to the memory; however, because the series of addresses of column 210 is different from the series of addresses of column 204, the memory is filled with the values of the second array in a different manner that the memory is filled with the values of the first array.

To transpose the values of the second array, the values of the second array should be read from the memory in the output order using the specific series of addresses shown in column 216. Thus, while the second array is written to the memory using the scrambled series of addresses shown in column 210, the series of addresses shown in column 216 may compensate for the scrambling and also transpose the values of the second array into the output order. The series of addresses needed to read each array in the sequence in the output order is also used to write the next array in the sequence in the input order. It will be appreciated that, for example, the series of addresses in column 208 may be associated with the first array and/or the second array.

Columns 206, 212, and 218 show a pattern for the series of binary addresses for writing the first, second, and third arrays. Each binary address in column 212 is a leftward rotation by 3 bits of the corresponding binary address in column 206. For example, the binary address "11111001" at level 220 of column 212 is a leftward rotation by 3 bits of the binary address "00111111" at level 220 of column 206. Similarly, each binary address in column 218 is a leftward rotation by 3 bits of the corresponding binary address in column 212.

FIG. 3 is a table 300 illustrating rotation amounts for each array in the example sequence of FIG. 2. Column 302 of table 300 specifies blocks of memory accesses, with each block of memory accesses serially writing the values of an array identified in column 304 and serially reading the values of an array identified in column 306. FIG. 3 illustrates an example having blocks of 256 memory accesses. It will be appreciated that the size of memory accesses may be another power of two or a size that is not a power of two.

For each block of 256 memory accesses of column 302, an 8-bit counter may count from 0 to 255, and the addresses for accessing the memory may be generated from the 8-bit count of the counter. Each bit of the address for accessing the memory may be one of the bits of the count, and each entry in column 308 specifies the bits of the count that are used to form the bits of the write addresses, listed from the most significant bit of the write address to the least significant bit of the write address. Similarly, column 310 specifies bits of the count that are used to form the read addresses. During the first block of accesses, the first array in the sequence is written to the memory and the data read from the memory may be discarded. Because the write and read addresses are identical in various embodiments of the invention, columns 308 and 310 may have identical entries after the first block of memory accesses.

Column 312 includes a calculation of the amount of a rotation or circular shift that is needed to generate the write and read addresses of columns 308 and 310 from an 8-bit count generated by a counter. Eight distinct rotation amounts are needed for the first eight blocks of memory accesses, and after the first eight blocks of memory accesses, the rotation amount repeats in a cyclic manner.

Referring back to FIG. 2, each column 206, 212, and 218 may specify a series of binary addresses beginning at address "00000000" with each successive address in the series generated from a preceding address by adding an increment amount that is constant for each column, with any carry-out from the most significant bit wrapping around for an increment equal to one least significant bit. For example, the increment amount is "00001000" for column 212 and the increment amount is "01000000" for column 218. Adding the amount "00001000" to the binary address "11111000" at level 222 of column 212 may generate an intermediate result of "00000000" plus a carry-out that is wrapped around to increment the intermediate result and generate the binary address of "00000001" at level 224 of column 212.

Figure 4:
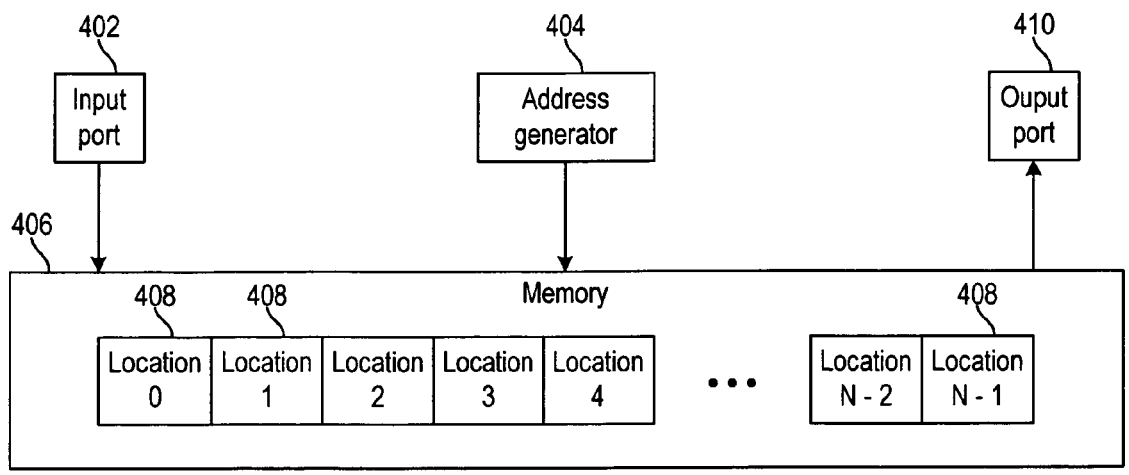
FIG. 4 is a block diagram of a circuit for reordering the values of arrays in a sequence in accordance with various embodiments of the invention.

FIG. 4 is a block diagram of a circuit for reordering the values of arrays in a sequence in accordance with various embodiments of the invention. The reordering may transpose some or all of the two or more dimensions of each array in the sequence. Generally, each array in the sequence has the same number of dimensions and identical sizes of the dimensions, such that each array in the sequence includes the same number of values, N.

An input port 402 serially receives the values in each array in the sequence. The values of an array in the sequence may be received at input port 402 in an input order that may be either a column-wise serial order or a row-wise serial order for a two dimensional array. A generator 404 generates an address, which is within a range of zero through one less than the number of values in the array, for each value in each array in the sequence.

A memory 406 accesses one of the locations 408 for each address from the generator 404. In certain embodiments, the memory 406 includes a number of the locations 408 that equals the number of values in each array in the sequence. In other embodiments, the memory 406 may include a number of locations 408 that is greater than the number of values in each array in the sequence; however, the number of locations 408 actually accessed may equal the number of values in each array in the sequence. For example, each array in the sequence may include a number of values that is not a power of two because one or more dimensions of the array might not be a power of two. Because implementations of memory 406 may frequently include a number of locations 408 that is a power of two, the size of memory 406 may be selected to be a power of two that is greater than the number of values in each array in the sequence.

Each access to an address from generator 404 includes a read from one of locations 408 that corresponds to the address before a write to the location. The writes serially write the values for each array in the sequence in the input order. The reads serially read the values for each array in the sequence in an output order, which differs from the input order. An output port 410 serially transmits the values in each array in the sequence in the output order.

Figure 5:
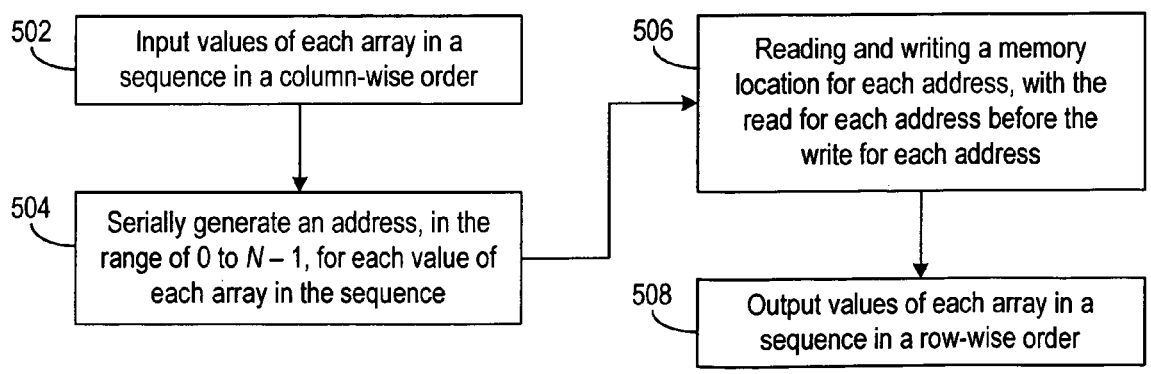
FIG. 5 is a flow diagram of a process for transposing arrays in a sequence in accordance with various embodiments of the invention.

FIG. 5 is a flow diagram of a process for transposing arrays in a sequence in accordance with various embodiments of the invention. Each array in the sequence may have two or more dimensions that include columns and rows. Each array in the sequence may include a number of values, N, that is a product from multiplying the numbers of columns, the number of rows, and the sizes of any other dimensions beyond columns and rows. It will be appreciated that an array may have a vertical and a horizontal dimension and the column dimension may correspond to either the vertical or horizontal dimension and the row dimension may correspond to the other one of the vertical or the horizontal dimension.

At step 502, the values in each array in the sequence are input in a column-wise serial order. At step 504, an address is serially generated for each value in each array in the sequence. The address for each value in each array in the sequence is within a range of zero through one less than the number of the values in the array.

At step 506, a memory is read and written for each generated address. For each address, a location of the memory at the address is read before the location is written. The writing of the memory for the addresses of each array in the sequence includes serially writing the values in the column-wise serial order. The reading of the memory for the addresses of each array in the sequence includes serially reading the values in a row-wise serial order. At step 508, the values in each array in the sequence are output in the row-wise serial order.

Figure 6:
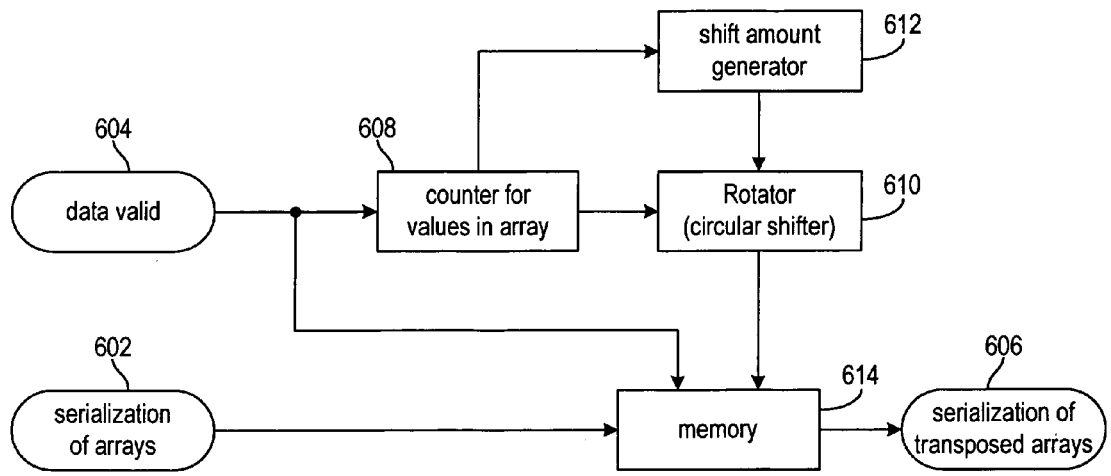
FIG. 6 is a block diagram of a circuit for transposing two-dimensional arrays having dimensions with sizes that are powers of two in accordance with one or more embodiments of the invention.

FIG. 6 is a block diagram of a circuit for transposing two-dimensional arrays having dimensions with sizes that are powers of two in accordance with one or more embodiments of the invention. The values from a sequence of arrays are provided at input port 602 in a column-wise serial order, and data valid signal 604 indicates whether the value at input port 602 is currently valid. For each valid value of an array in the sequence that is provided at input port 602 in the column-wise serial order, a value of a preceding array in the sequence is provided at output port 606 in a row-wise serial order.

For each array in the sequence, counter 608 generates a count of zero through one less than the number of values in the array. Counter 608 increments the count by one for each assertion of the data valid signal 604. Rotator 610 circularly shifts the count from counter 608 by a rotation amount provided from shift amount generator 612. In one embodiment, shift amount generator 612 is a shift amount lookup table of a Xilinx programmable logic device available from Xilinx, Inc. The rotation amount from shift amount generator 612 may be updated for each array in the sequence when the counter 608 indicates the count has reached the terminal count of one less than the number of values in the array. In one embodiment, the shift amount generator 612 increments the rotation amount for each array in the sequence by the base-two logarithm of the number of rows in the array modulo the base-two logarithm of the number of values in the array, which equals the sum of the respective base-two logarithms of the number of rows and the number of columns in the array.

A valid value of an array in the sequence from input port 602 is written to a location in memory 614 specified by the address from rotator 610 after reading a value of a preceding array in the sequence from this location in memory 614. The value read for the preceding array in the sequence is transmitted at output port 606.

Figure 7:
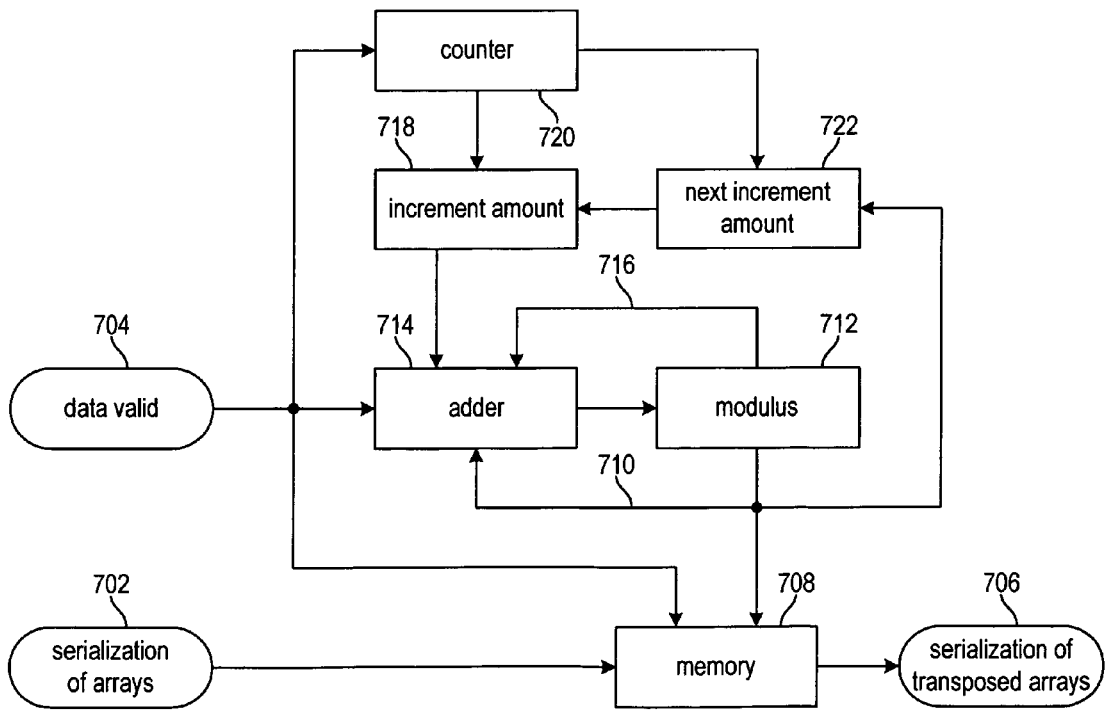
FIG. 7 is a block diagram of a circuit for reordering arrays having dimensions with arbitrary sizes in accordance with one or more embodiments of the invention.

FIG. 7 is a block diagram of a circuit for reordering arrays having dimensions with arbitrary sizes in accordance with one or more embodiments of the invention. The values from a sequence of arrays are provided at input port 702 in an input serial order, and data valid signal 704 indicates whether the value at input port 702 is currently valid. For each valid value of an array in the sequence that is provided at input port 702 in the input serial order, a value of a preceding array in the sequence is provided at output port 706 in an output serial order.

Each valid value from input port 702 is written to a location in memory 708 that is specified by the address on line 710 from the modulus block 712. The modulus block 712 ensures that the address on line 710 is in a range of zero through one less than the number of values in each array in the sequence. Before the write of a valid value from input port 702 to a location in memory 708, the location is read and the value read may be transmitted at output port 706.

The adder 714 adds an increment to the address on line 710. Modulus block 712 performs a modulus operation on the sum from adder 714. Modulus block 712 determines the quotient on line 716 and the remainder on line 710 from a division of the sum from adder 714 by the number of values in each array in the sequence. The quotient on line 716 may be either zero or one, and the quotient is feed back to the adder 714 to "wrap around" a carry when the sum from the adder 714 exceeds the number of values in each array in the sequence. The increment amount 718 is constant for each value of a particular array in the sequence. Thus, for a particular array in the sequence, the address on line 710 increments for each valid value by either the increment amount 718 or one more than the increment amount 718 when the quotient on line 716 is one.

To track the arrays in the sequence, counter 720 generates a count from zero to one less than the number of values in each array in the sequence. The increment amount 718 is updated from the next increment amount 722 when the count of counter 720 reaches the terminal count of one less than the number of values in each array in the sequence. The next increment amount 722 is updated to the address on line 710 when the count of counter 720 reaches a count corresponding to a size of a dimension of each array in the sequence. For example, each array in the sequence may have 7 rows and 24 columns that are received at input port 702 in a column-wise order and are transmitted at output port 706 is a row-wise order. The next increment amount 722 may be updated to the address on line 710 when the count from counter 720 reaches a value of the number of rows in each array in the sequence.

Because the address on line 710 may be set to zero for the first value in the input order of each array in the sequence and the quotient on line 716 may be zero until after the next increment amount 722 is updated, the next increment amount 722 may be a product from multiplying the increment amount 718 by the size of a dimension of each array in the sequence. The next increment amount 722 becomes the increment amount 718 for a next array in the sequence. The adjustment of the increment amount 718 for each array in the sequence may compensate for writing the values of each array in the sequence at the addresses in memory 708 that are needed to reorder the values of a preceding array in the sequence.

Figure 8:
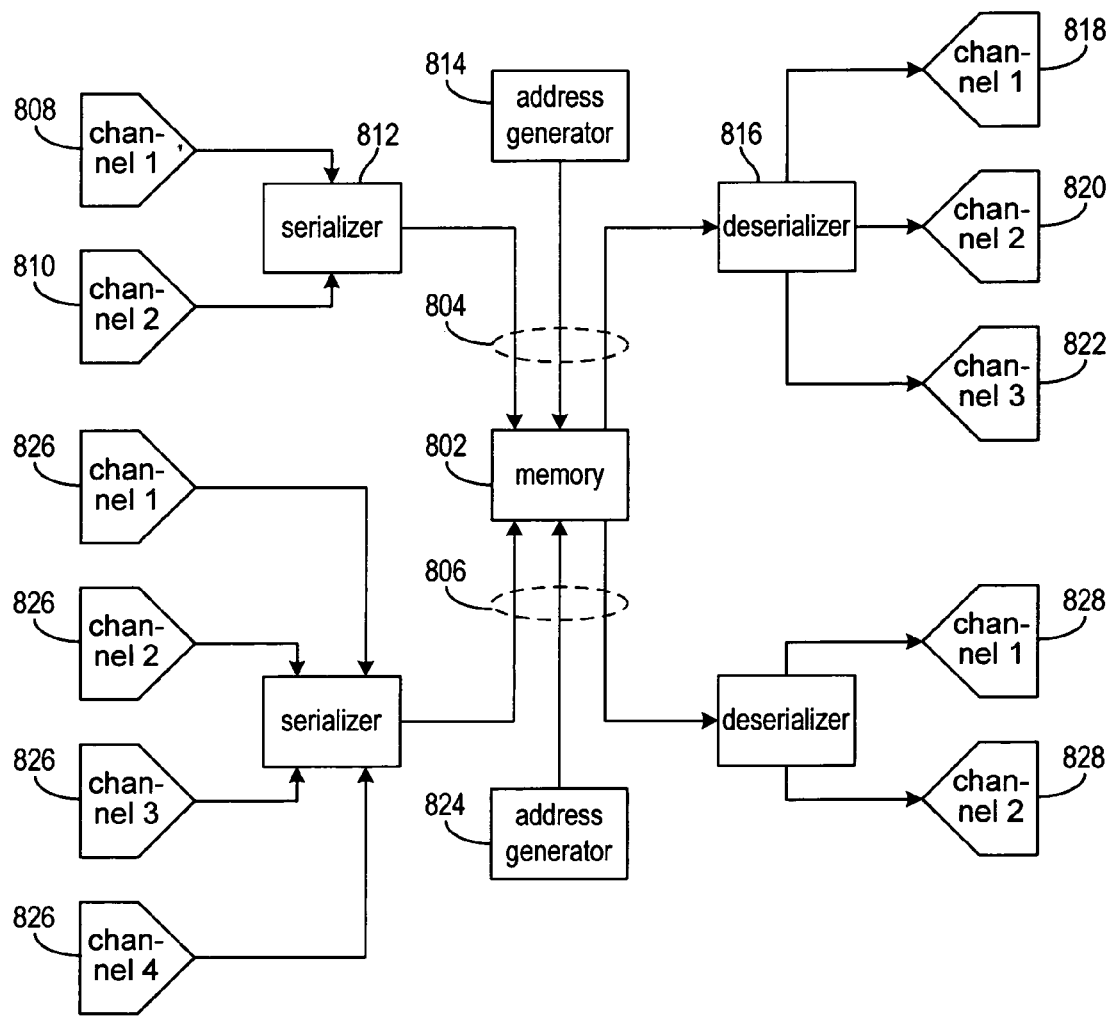
FIG. 8 is a block diagram of a circuit for transposing arrays in two independent sequences of arrays in accordance with one or more embodiments of the invention.

FIG. 8 is a block diagram of a circuit for transposing arrays in two independent sequences of arrays in accordance with one or more embodiments of the invention. The arrays in a first sequence of arrays may have 2 rows and 3 columns and the arrays in a second sequence of arrays may have 4 rows and 2 columns. Memory 802 may be a dual port memory with a first port 804 for transposing arrays in the first sequence and a second port 806 for transposing arrays in the second sequence.

The values from the columns of each array in the first sequence may be received in parallel at channels 808 and 810 in an order from the least significant column to the most significant column. Channels 808 and 810 may respectively receive the values of the first and second rows of the columns of each array in the first sequence. Serialization block 812 may convert the columns of values received in parallel into a serial stream of values in a column-wise order. The serial stream of values may be written to memory 802 via port 804 at addresses supplied from address generator 814 via port 804.

For each value of an array of the first sequence that is written to the memory 802 in a column-wise order via port 804, a value of a previous array in the first sequence may be read from the memory 802 in a row-wise order via port 804. The stream of values read from memory 802 via port 804 in the row-Wise order may be transferred to de-serialization block 816, which accumulates rows of each array in the first sequence. The values from the rows of each array in the first sequence may be transmitted in parallel at channels 818, 820, and 822 in an order from the least significant row to the most significant row. Channels 818, 820, and 822 may respectively transmit the values of the first, second, and third columns of the rows of each array in the first sequence.

Port 806 may similarly be used to transpose each array in a second sequence of arrays. The addresses generated by generator 814 may be distinguished from the addresses generated by address generator 824, such that locations in memory 802 accessed using generator 814 do not overlap with the locations in memory 802 accessed using generator 824. For example, memory 802 may have sixteen locations that might be accessed using a 4-bit address from either port 804 or port 806. To ensure distinct addresses, port 804 may be arranged to always set the most significant bit of the 4-bit address to zero and port 806 may be arranged to always set the most significant bit of the 4-bit address to one, with the least significant three bits of each address set by generators 814 and 824 in a range between zero and one less than the number of values in each array in the respective sequences.

The transposing of the second sequence of arrays may be independent from the transposing of the first sequence of arrays. For example, channels 808 and 810 may receive columns of values and channels 818, 820, and 822 may transmit rows of data, while channels 826 may receive rows of values and channels 828 may transmit columns of values.

Certain integrated circuits may include one or more dual port memories. For example, programmable logic devices from Xilinx, Inc. include dedicated memory blocks that are configurable to implement a dual port memory. These dedicated memory blocks may also be configurable to provide a "read before write" property for reading the current contents of a location addressed by either port before updating the location with new data. When such a dual port memory has enough capacity to store one array from each of two sequences of arrays, the dual port memory may be used to reorder each array in each of the two sequences using one or more embodiments of the invention.

An example application may receive blocks or packets of data in parallel from multiple channels. For example, each channel may periodically create digital samples that represent the analog value of a channel input. A packet processor may process a block of data from a channel, and the packet processor may use time-division multiplexing to successively process a packet of data from each of several channels. Each packet of data may correspond to a row of a sequence of arrays and the channels may correspond to the columns of the sequence of arrays. A transpose operation may create successive packets of data for processing by the packet processor from the channels sampled in parallel. Example applications for reordering a sequence of arrays in accordance with various embodiments of the invention may also include array reordering for multidimensional discrete cosine transforms and multidimensional fast Fourier transforms.

The present invention is thought to be applicable to a variety of systems for reordering each array in a sequence of arrays. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A circuit for reordering each of a plurality of arrays in a sequence, the circuit comprising:
   a first port for receiving in a first serial order a number of values in each array in the sequence, wherein each array in the sequence has at least two dimensions;
   a generator of an address for each value in each array in the sequence, the address for each value in each array in the sequence being within a range of zero through one less than the number of values in the array;
   wherein the generator generates addresses for the arrays in the sequence in which the at least two dimensions are not equal and generates addresses for the arrays in the sequence in which the at least two dimensions are equal;
   a memory coupled to the first port and the generator, the memory adapted to perform an access to a location in the memory for each address from the generator, the access for each address including a read from the location that corresponds to the address before a write to the location in the memory, wherein the reads for the addresses serially read the values in a second serial order for each array in the sequence and the writes for the addresses serially write the values in the first serial order for each array in the sequence; and a second port coupled to the memory, the second port for transmitting in the second serial order the values in each array in the sequence, wherein the second serial order is different from the first serial order.

2. The circuit of claim 1, wherein for each array in the sequence, the first serial order is a particular type of a serialization of the values of the array and the second serial order is the particular type of a serialization of the values of a transpose of the array.

3. The circuit of claim 2, wherein each array in the sequence has two dimensions that are a row dimension and a column dimension, and the particular type of the serializations has an order that is either a row-wise order or a column-wise order.

4. The circuit of claim 1, wherein each array in the sequence has two dimensions that are a row dimension and a column dimension, and the first serial order is one of a row-wise order or a column-wise order and the second serial order is another one of the row-wise order or the column-wise order.

5. The circuit of claim 1, wherein the memory has a capacity that is the number of values.

6. The circuit of claim 1, wherein the memory has a capacity that is less than twice the number of values.

7. The circuit of claim 1, wherein the memory has a single port including an address input, a data input, and a data output, the address input coupled to receive the address from the generator, the data input coupled to receive the values in each array in the sequence in the first serial order at the first port, the data output coupled to transmit the values in each array in the sequence in the second serial order at the second port.

8. The circuit of claim 1, wherein the memory has a third and fourth port, the third port coupled to the first and second ports and the generator, the fourth port coupled to another generator for transposing each of a plurality of arrays in another sequence.

9. The circuit of claim 1, wherein the accesses to the locations in the memory for the addresses from the generator for the values of a particular array in the sequence include the reads for the addresses that serially read the values in the second serial order for the particular array in the sequence and the writes for the addresses that serially write the values in the first serial order for a next array following the particular array in the sequence.

10. The circuit of claim 1, wherein the at least two dimensions of each array in the sequence is a first dimension with a first size and a second dimension with a second size, and the number of values in each array in the sequence is a product from multiplying the first and second sizes.

11. The circuit of claim 10, wherein the generator increments the address for each value in each array in the sequence to be a remainder of a modulus operation of a sum of the address, a quotient from the modulus operation, and an increment amount, which the generator updates for each array in the sequence to be a product from multiplying the increment amount and the first size.

12. The circuit of claim 11, wherein for each array in the sequence, after the generator increments the address for a number of times equaling the first size, the generator saves the address as the product for updating the increment amount for a next array in the sequence.

13. The circuit of claim 10, wherein the first serial order of the values in each array in the sequence includes a respective one of the values in the array for each value of a first index for the first dimension for each value of a second index for the second dimension, and the second serial order of the values in each array in the sequence includes a respective one of the values in the array for each value of the second index for the second dimension for each value of the first index for the first dimension.

14. The circuit of claim 10, wherein the first and second sizes are different powers of two, and the generator generates the address for each value in each array in the sequence from one of at least three amounts of rotation of a count from a counter, which increments the count by one for each value in each array in the sequence.

15. The circuit of claim 14, wherein the generator updates the amount of the rotation of the count for each array in the sequence as a function of respective base-two logarithms of the first and second sizes.

16. A method for transposing each of a plurality of arrays in a sequence, the method comprising:

inputting in a column-wise serial order a plurality of values in each array in the sequence, wherein the array has a first number of rows and a second number of columns, with a third number of the values in the array being a product from multiplying the first and second numbers;

serially generating an address for each value in each array in the sequence, the address for each value in each array in the sequence being within a range of zero through one less than the third number of the values in the array;

wherein the serially generating includes serially generating addresses for the arrays in the sequence in which the first and second numbers are not equal and serially generating addresses for the arrays in the sequence in which the first and second numbers are equal;

reading and writing a memory for each address, including reading a location of the memory at the address before writing the location of the memory at the address, wherein the writing of the memory for the addresses of each array in the sequence includes serially writing the values in the column-wise serial order for the array and the reading of the memory for the addresses of each array in the sequence includes serially reading the values in a row-wise serial order for the array; and outputting in the row-wise serial order the values in each array in the sequence.

17. The method of claim 16, wherein the memory has a capacity that is the third number of the values in the array and the memory has a single port, which includes a data input for the inputting in the column-wise serial order of the values in each array in the sequence, an address input for inputting the address for each value in each array in the sequence, and a data output for the outputting in the row-wise serial order of the values in each array in the sequence.

18. The method of claim 16, wherein the reading of the memory for the addresses of a particular array in the sequence includes the serially reading of the values in the row-wise serial order for the particular array and the writing of the memory for the addresses of the particular array in the sequence includes the serially writing of the values in the column-wise serial order for a next array following the particular array in the sequence.

19. The method of claim 16, wherein the first and second numbers are different powers of two, and the serially generating of the address includes incrementing a count by one for each value in each array in the sequence, rotating the count by one of at least three rotation amounts for each value in each array in the sequence, and updating the rotation amount for each array in the sequence.

20. A circuit for transposing each of a plurality of arrays in a sequence, the method comprising:
- means for inputting in a column-wise serial order a plurality of values in each array in the sequence, wherein the array has a first number of rows and a second number of columns, with a third number of the values in the array being a product from multiplying the first and second numbers;
- means for serially generating an address for each value in each array in the sequence, the address for each value in each array in the sequence being within a range of zero through one less than the third number of the values in the array;
- wherein the means for serially generating includes means for serially generating addresses for the arrays in the sequence in which the first and second numbers are not equal and means for serially generating addresses for the arrays in the sequence in which the first and second numbers are equal;
- means for reading and writing a memory for each address, including reading a location of the memory at the address before writing the location of the memory at the address, wherein the writing of the memory for the addresses of each array in the sequence includes serially writing the values in the column-wise serial order for the array and the reading of the memory for the addresses of each array in the sequence includes serially reading the values in a row-wise serial order for the array; and
- means for outputting in the row-wise serial order the values in each array in the sequence.

* * * * *